US012571774B2

(12) United States Patent (10) Patent No.: US 12,571,774 B2
Guo et al. (45) Date of Patent: Mar. 10, 2026

(54) INTERNAL STATE DETECTING SYSTEM AND METHOD FOR ENERGY STORAGE DEVICES

(71) Applicant: JINAN UNIVERSITY, Guangzhou (CN)

(72) Inventors: Tuan Guo, Guangzhou (CN); Xiaobin Xue, Guangzhou (CN); Xile Han, Guangzhou (CN); Linhao Li, Guangzhou (CN)

(73) Assignee: JINAN UNIVERSITY, Guangzhou (CN)

( * ) Notice: Subject to any disclaimer, the term of this patent is extended or adjusted under 35 U.S.C. 154(b) by 432 days.

(21) Appl. No.: 18/350,751

(22) Filed: Jul. 12, 2023

(65) Prior Publication Data

US 2024/0019405 A1 Jan. 18, 2024

(30) Foreign Application Priority Data

Jul. 13, 2022 (CN) .......................... 202210818161.6

(51) Int. Cl.
*G01N 29/24* (2006.01)
*G01N 29/04* (2006.01)
*H01M 10/48* (2006.01)

(52) U.S. Cl.
CPC ......... *G01N 29/2418* (2013.01); *G01N 29/04* (2013.01); *H01M 10/48* (2013.01); *G01N 2291/023* (2013.01)

(58) Field of Classification Search
None
See application file for complete search history.

(56) References Cited

U.S. PATENT DOCUMENTS

| 5,600,133 | A | * | 2/1997 | Spillman, Jr. | ...... | G01N 29/2418 |
| | | | | | | 250/227.14 |
| 2021/0025945 | A1 | * | 1/2021 | Guo | .................. | G02B 6/02133 |

* cited by examiner

*Primary Examiner* — Suman K Nath

(57) ABSTRACT

An in-situ and in-operando internal state detecting system for an energy storage device comprises a first acoustic signal-emitting acoustic signal emission module, an interior-residing optical sensing module, and a first input optical signal-providing signal demodulation module. The optical sensing module receives a second acoustic signal when the first acoustic signal transmits inside the energy storage device, and outputs a first optical signal, which is demodulated and analyzed by the signal demodulation module to obtain acoustic feature information. Optionally, the signal demodulation module also provides a second input optical signal, and the optical sensing module outputs a second optical signal, which is analyzed by the signal demodulation module to obtain optical feature information. Based on the acoustic and optical feature information, one or more internal states of the energy storage device, such as dendrite growth, internal gas generation, electrode expansion, electrolyte aging, or refractive index, etc., can be determined.

20 Claims, 3 Drawing Sheets

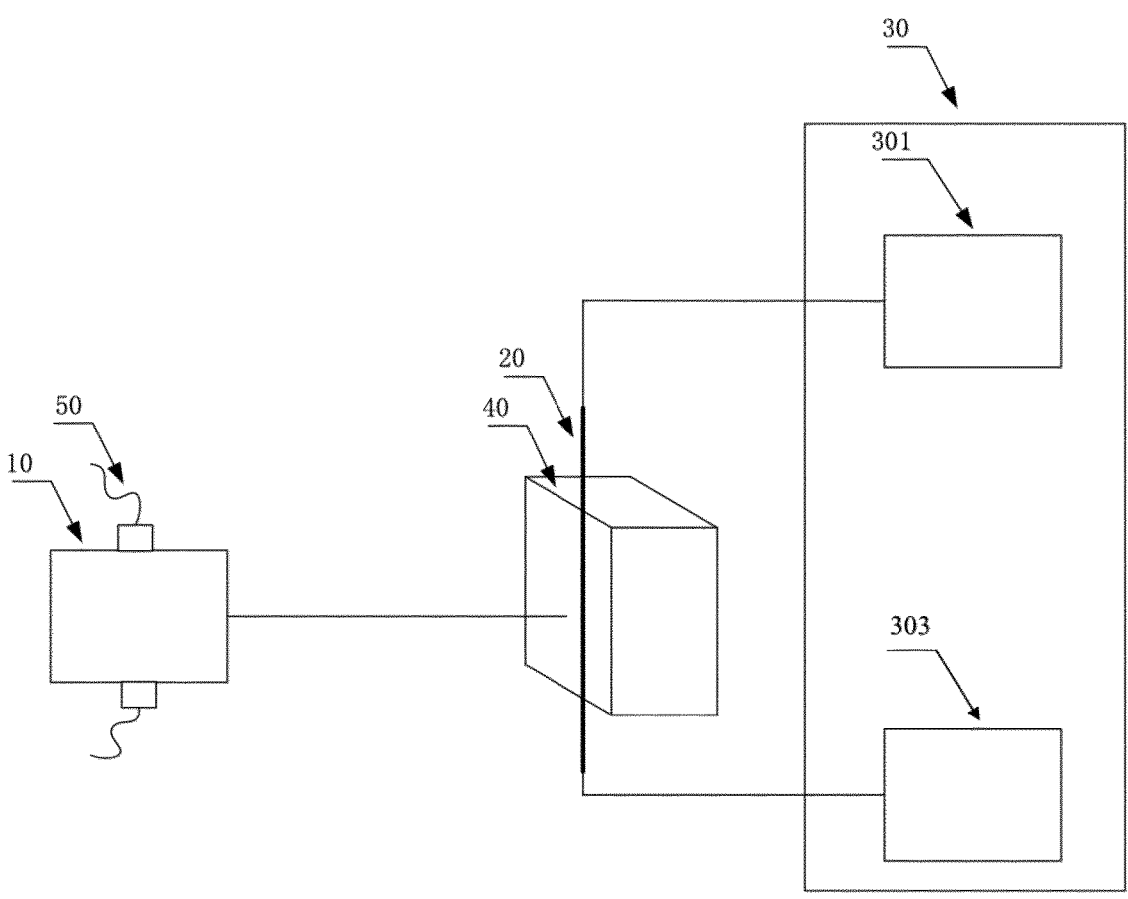
FIG. 3
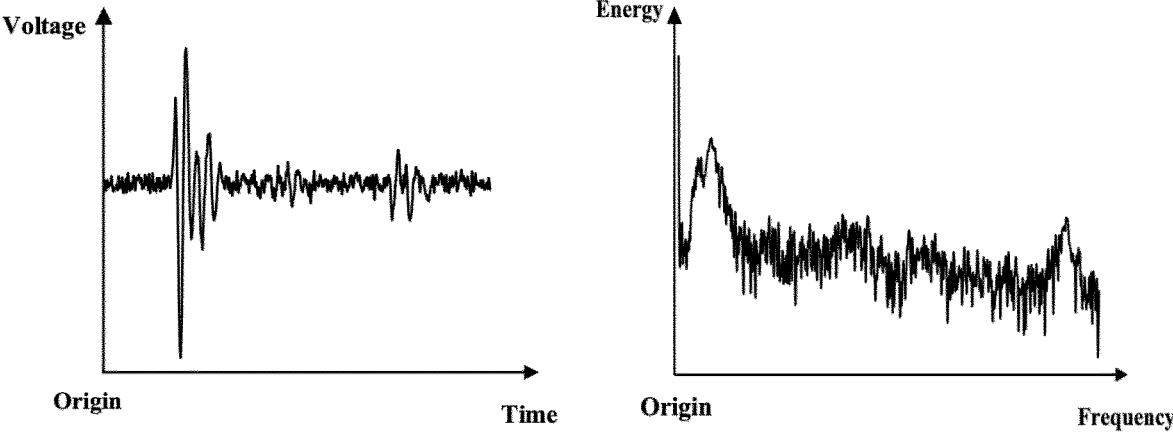
FIG. 4                    FIG. 5

INTERNAL STATE DETECTING SYSTEM AND METHOD FOR ENERGY STORAGE DEVICES

CROSS-REFERENCE TO RELATED APPLICATION

The present application claims priority to Chinese Patent Application No. 202210818161.6 filed on Jul. 13, 2022, whose disclosure is hereby incorporated by reference in its entirety.

TECHNICAL FIELD

The present disclosure relates generally to the technical field of energy storage devices, and in particular to an internal state detecting system and method that can be utilized to detect, in an in situ and in operando manner, the internal state(s) of an energy storage device such as a battery or a supercapacitor.

BACKGROUND

With the rapid development of energy storage technologies, the safety issue is getting increasingly serious in the application scenarios such as emergency or standby power supply in power systems, electric vehicles, computers, mobile phones and other portable mobile devices, energy storage power stations, etc. The primary cause of safety accidents is in the battery itself. During the use of energy storage devices, there may be problems such as the formation of solid electrolyte interphase (SEI) films, cathode electrolyte interphase (CEI) films, dendrite growth, gas generation, temperature changes, uneven pressure, and electrode material phase transitions, etc. Monitoring these phenomena can deepen the understanding of energy storage failure mechanisms and electrochemical performance, thereby avoiding safety accidents.

In existing technologies, monitoring the states of an energy storage device is typically achieved by monitoring some macroscopic and comprehensive physical quantities outside the energy storage device, such as voltage, current, and external temperature, and then evaluating the health and safety of the energy storage device through a specialized simulation system. However, this monitoring approach has shortcomings such as large errors, low accuracy, and inability to timely and effectively monitor abnormal states such as bubbles and metal precipitation inside the energy storage device. Research has shown that neutron diffraction based characterization methods are sensitive to light elements such as hydrogen (H) and lithium (Li), and can be used to study electrolyte wetting, gas generation, and ion distribution, however the high cost and inconvenience has seriously limited their wide applications.

To address these above issues, it has been shown that acoustic and optical signals, especially ultrasonic signals, have good penetrability and directionality, and can be used in defect detection and imaging technologies. Currently, there have been attempts to use acoustic and optical signals for monitoring the internal states of an energy storage device, but the following issues have been found. The use of acoustic and optical signals to scan an energy storage device is only limited to transmitting and receiving acoustic signals from the outside of the entire energy storage device. The acoustic and optical signal device is usually too large to conduct local acoustic analysis on the interior of the energy storage device. In addition, it is also unable to determine the source of acoustic and optical signals, thereby unable to accurately analyze the electrode characteristics and electrochemical characteristics of the energy storage device.

SUMMARY OF THE INVENTION

The purpose of the present disclosure is to provide an internal state detecting system and method for an energy storage device. The detecting system (exchangeable to "detection system", "monitoring system", or alike) and method is substantially based on acoustic and optical signals, and can be used for the in-situ and in-operando detection of one or more internal state(s), such as dendrite growth, internal gas generation, electrode expansion, electrolyte aging, by-product production, and internal temperature and pressure, and refractive index of the electrolyte, etc., of an energy storage device.

On a first aspect, a system that is capable of in-situ and in-operando detecting or monitoring one or more internal states of an energy storage device is provided.

The detecting system comprises an acoustic signal emission module, an optical sensing module, and a signal demodulation module. The optical sensing module is arranged in an interior of the energy storage device, the acoustic signal emission module is configured to provide a first acoustic signal from an outside of the energy storage device to an inside of the energy storage device, and the signal demodulation module is configured to provide a first input optical signal to the optical sensing module. The optical sensing module is configured, upon receiving a second acoustic signal when the first acoustic signal transmits inside the energy storage device, to output a first optical signal to the signal demodulation module, and the signal demodulation module is further configured to demodulate and analyze the first optical signal to thereby obtain acoustic feature information, and then to obtain a first internal state information of the energy storage device based on the acoustic feature information. Herein, the first internal state information comprises at least one of dendrite growth, internal gas generation, electrode expansion, electrode aging, electrolyte aging, by-product generation, internal resistance, or state of charge (SOC) of the energy storage device.

According to some embodiments of the detecting system, the signal demodulation module is further configured to provide a second input optical signal to the optical sensing module; the optical sensing module is further configured, upon receiving the second input optical signal, to output a second optical signal to the signal demodulation module; and the signal demodulation modulation module is further configured to demodulate and analyze the second optical signal to thereby obtain optical feature information, and then to obtain a second internal state information of the energy storage device based on the optical feature information. Herein, the second internal state information comprises at least one of an internal temperature, an internal pressure, or a refractive index of an electrolyte of the energy storage device.

As used herein, the term "module" is referred to as an entity that may comprise a hardware, and optionally may further comprise a software that runs on the hardware to control the hardware to implement its designed functionality and to provide certain other functionalities, such as data processing and analysis.

Optionally, the first acoustic signal emitted by the acoustic signal emission module is of a preset frequency having a range of 20 kHz to 20 MHz, and preferably of 200 kHz to 10 MHz.

According to some embodiments, the first acoustic signal has a present frequence of approximately 5 MHz.

Optionally, the acoustic signal emission module is capable of moving on an outer surface of the energy storage device, thereby allowing the system to realize a multi-point monitoring of the energy storage device.

According to some embodiments of the detecting system, the optical sensing module comprises at least one optical sensor, each arranged at a different characterizing position in the interior of the energy storage device. Herein, the characterizing position may be selected from a group consisting of a position corresponding to an electrode, a position corresponding to an internal gap, a position corresponding to a separator, a position corresponding to an electrolyte, and a position corresponding to an electrode tab. Herein, the internal gap may include one or more gaps that correspond to the hole in a cylindrical battery, the top cover of a square shell battery, and an inner position of a battery shell.

Optionally, there is only one optical sensor for the optical sensing module. Optionally, the number of the at least one optical sensor in the optical sensing module can be more than one, and as such, the at least one optical sensor can be operably connected in series or in parallel.

Depending on different embodiments, each of the at least one optical sensor can be an active optical sensor or a passive optical sensor. Herein the passive optical sensor can be selected from an optical chip or a fiber sensor. In embodiments where an optical fiber sensor is utilized, the optical fiber can be of a type selected from the following optical fiber sensors: tilted Bragg fiber gratings, fiber Bragg gratings, long-period gratings, fiber core diameter mismatch devices, fiber core misalignment devices, tapered fiber devices, micro-nano fiber devices, photonic crystal fiber devices, microstructured fiber devices, polymer fiber devices, sapphire fiber devices, fiber laser devices, fiber coupler devices, and self-assembled optical devices.

Herein, according to some embodiments, the optical sensing module comprises an optical fiber sensor having tilted fiber Bragg gratings (TFBGs), which can have a tilted angle of approximately 4-45 degrees, and preferably of approximately 10-18 degrees, and more preferably of approximately 16 degrees.

According to some embodiments of the detecting system, the optical sensing module is of a reflective type.

As such, the signal demodulation module comprises a light source, an optical signal analyzer, and an optical path connector. The light source is configured to provide the first input optical signal to the optical sensing module; the optical path connector operably connects the light source, the optical sensing module, and the optical signal analyzer, and is configured, upon receiving the first optical signal from the optical sensing module, to transmit the first optical signal to the optical signal analyzer; and the optical signal analyzer is configured to demodulate the first optical signal to thereby obtain the acoustic feature information.

Further optionally, the light source is further configured to provide a second input optical signal to the optical sensing module; the optical sensing module is further configured, upon receiving the second input optical signal from the light source, to output a second optical signal to the optical path connector; the optical path connector is further configured to transmit the second optical signal to the optical signal analyzer; and the optical signal analyzer is further configured to demodulate the second optical signal to thereby obtain the optical feature information.

According to some other embodiments of the detecting system, the optical sensing module is of a transmissive type.

As such, the signal demodulation module comprises a light source and an optical signal analyzer. The light source, the optical sensing module, and the optical signal analyzer are sequentially and operably connected; the light source is configured to provide the first input optical signal to the optical sensing module; and the optical signal analyzer is configured to demodulate the first optical signal from the optical sensing module to thereby obtain the acoustic feature information.

Further optionally, the light source is further configured to provide a second input optical signal to the optical sensing module; the optical sensing module is further configured, upon receiving the second input optical signal from the light source, to output a second optical signal to the optical signal analyzer; and the optical signal analyzer is further configured to demodulate the second optical signal to thereby obtain the optical feature information.

Herein, the reflective and transmissive optical sensors are well known in the field, and the specific structures and working mechanisms are hereby skipped for conciseness.

In any of the embodiments of the detecting system as described above, the energy storage device can be a lithium battery, a sodium battery, a lead-acid battery, a fuel cell, a sodium-sulfur battery, a flow battery, a liquid metal battery, a metal air battery, a solar cell, and a supercapacitor.

On a second aspect, an internal state detecting method (i.e. detection method, monitoring method, or alike) for an energy storage device that substantially utilizes the detecting system as described above is also provided.

According to some embodiments, the detection method may be based on the detecting system that is capable of derive the internal state information of the energy storage device by means of acoustic signals. As such, the detection method comprises the following steps:

(1) the acoustic signal emission module provides the first acoustic signal from the outside of the energy storage device to the inside of the energy storage device, and the signal demodulation module provides the first input optical signal to the optical sensing module;

(2) upon receiving the second acoustic signal when the first acoustic signal transmits inside the energy storage device, the optical sensing module modulates the first input optical signal and outputs a first optical signal; and (3) upon receiving the first optical signal, the signal demodulation module demodulates and analyzes the first optical signal to thereby obtain acoustic feature information, and further determines the first internal state of the energy storage device based on the acoustic feature information.

Herein, the first internal state may comprise at least one of dendrite growth, internal gas generation, electrode expansion, electrode aging, electrolyte aging, by-product generation, internal resistance, or state of charge (SOC) of the energy storage device.

Herein, depending on different purposes and embodiments, step (3) may comprise at least one of the following analyses: time-domain intensity change analysis, wave velocity change analysis, and frequency-domain main lobe and side lobe power change analysis, to thereby obtain the first internal state information (e.g. dendrite growth, internal gas generation, etc.) of the energy storage device.

According to some other embodiments, the detection method may be based on the detecting system that is capable of derive the internal state information (i.e. the first internal state information and the second internal state information) of the energy storage device by means of both acoustic signals and optical signals. As such, the detection method comprises, on top of the three steps described above, the following steps:

step (1) further comprises: the signal demodulation module further provides the second input optical signal to the optical sensing module;

step (2) further comprises: upon receiving the second input optical signal, the optical sensing module further outputs the second optical signal; and step (3) further comprises: upon receiving the second optical signal, the signal demodulation modulation module demodulates the second optical signal to thereby obtain the optical feature information, and further determines the second internal state of the energy storage device based on the optical feature information.

Herein, the second internal state comprises at least one of an internal temperature, an internal pressure, or a refractive index of an electrolyte of the energy storage device.

Herein, depending on different purposes and embodiments, step (3) may comprise at least one of the following analyses: intensity change analysis, wavelength change analysis, envelope change analysis, and area change analysis, to thereby obtain the second internal state information (e.g. internal temperature, internal pressure, refractive index, etc.) of the energy storage device.

By utilizing the detecting system and method described above, the first internal state information (e.g. dendrite growth, internal gas generation, electrode expansion, electrode aging, electrolyte aging, by-product generation, internal resistance, or state of charge (SOC), etc.) and optionally the second internal state information (e.g. internal temperature, internal pressure, refractive index, etc.) of the energy storage device can be detected in an in situ and in operando (e.g. real time) manner, so as to realizing an in-situ and real-time monitoring of the health status, hazardous status, and the working performance of the energy storage device.

On a third aspect, the present disclosure further provides a processing device for controlling and implementing the internal state detecting method as described above. To be more specific, the present disclosure provides a computerized device that can be used to control the detecting system as described above in the first aspect. The processing device is communicatively connected to the acoustic signal emission module, the optical sensing module, and the signal demodulation module of the internal state detecting system as described above, and includes a processor and a memory storing computer program instructions that are executable by the processor. When executed by the processor, the computer program instructions would allow the steps of the internal state detecting method as described above to be orderly executed and implemented.

On a fourth aspect, the present disclosure further provides a computer readable storage medium, on which the computer program instructions as described above in the third aspect are stored. When the computer program instructions are executed by the processor, the various steps of the detection method can be orderly executed and implemented.

BRIEF DESCRIPTION OF THE DRAWINGS

In order to provide a clearer explanation of the technical solutions of the embodiments of the present disclosure, a brief description is given to the accompanying drawings. It should be noted that the accompanying drawings in the following description represent part of certain embodiments of the present disclosure. For artisans of ordinary skills in the art, other accompanying drawings can be obtained based on these drawings without any creative effort.

FIG. 3 a schematic diagram of an internal state detecting system for an energy storage device provided by some embodiments of the present disclosure, which includes a transmissive type of optical sensing module;

FIG. 4 shows a time-domain waveform when the optical sensing module in some embodiments of the internal state detecting system receives acoustic signals after being arranged inside the energy storage device;

FIG. 5 shows a frequency spectrum of acoustic signals when the optical sensing module in some embodiments of the internal state detecting system receives acoustic signals after being arranged inside the energy storage device;

LEGENDS IN THE DRAWINGS

10. Acoustic Signal Emission Module;
20. Optical Sensing Module;
30. Signal Demodulation Module;
301. Light Source;
302. Optical Path Connector;
303. Optical Signal Analyzer;
40. Energy Storage Device;
50. Movable Brace.

DETAILED DESCRIPTION

In the following, description of the technical solution for certain embodiments of the present disclosure will be provided in more detail with reference to the accompanying drawings. It is to be noted that the embodiments as described herein are interpreted to constitute part, and not all, of the embodiments of the present disclosure. Based on these embodiments in the present disclosure, all other embodiments that can be obtained by people of ordinary skills in the art without involving inventive steps are interpreted to also fall within the scope of protection of the present disclosure.

It should be understood that when used in this specification and the accompanying claims, the terms "comprise", "comprising", "include", "including", and alike, are interpreted to open-ended and indicate the presence of the described features, elements, steps, operations, components, and/or combinations thereof, but do not exclude the presence or addition of one or more other features, elements, steps, operations, components, and/or combinations thereof.

It should also be understood that the terms used in this specification of the present disclosure are only for the purpose of describing specific embodiments and are not intended to impose any limitation to the present disclosure. As used in the specification and the accompanying claims, unless expressly indicated otherwise, the singular forms of "one", "one", and "the" are intended to include the plural forms.

It should also be further understood that the term "and/or" as used in the specification and the accompanying claims refers to any combination of one or more of the related listed items and all possible combinations, and includes these combinations.

On a first aspect, the present disclosure provides an internal state detecting system for an energy storage device.

Figure 1:
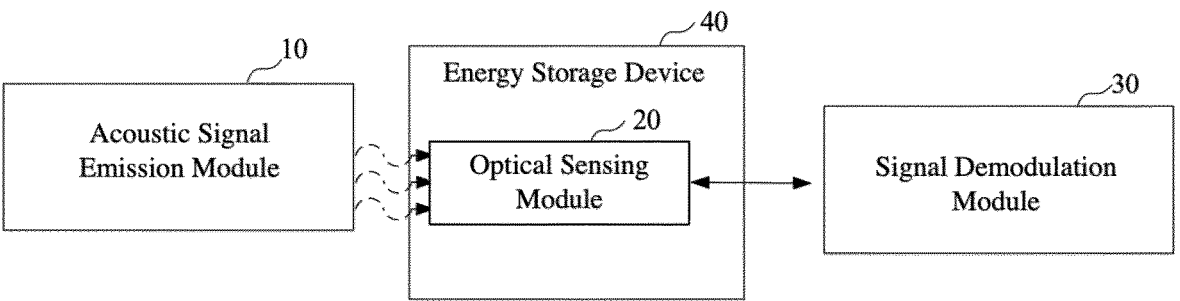
FIG. 1 illustrates a block diagram of an internal state detecting system for an energy storage device provided by some embodiments of the present disclosure.

FIG. 1 illustrates a block diagram of a detecting system for an energy storage device provided by some embodiments of the present disclosure. As shown in FIG. 1, the detecting system includes an acoustic signal emission module 10, an optical sensing module 20, and a signal demodulation module 30.

The optical sensing module 20 is disposed or arranged in an interior of (i.e. inside) the energy storage device 40. The signal demodulation module 30 is configured to provide a first input optical signal to the optical sensing module. The acoustic signal emission module 10 is configured to emit a first acoustic signal from the outside of the energy storage device 40 to the inside of the energy storage device 40. The optical sensing module 20 is configured, upon receiving a second acoustic signal when the first acoustic signal transmits inside the energy storage device and reaches the optical sensing module 20, to output a first optical signal to the signal demodulation module (herein the first optical signal substantially results from the modulation of the second acoustic signal to the first input optical signal). The signal demodulation module 30 is further configured to demodulate and analyze the first optical signal to thereby obtain the acoustic feature information for evaluating the performance of the energy storage device 40. Herein the acoustic feature information contains information of, and can be used for determining, the first internal state information of the energy storage device, which includes information such as dendrite growth, internal gas generation, electrode expansion, electrode aging, electrolyte aging, by-product generation, internal resistance, or state of charge (SOC), etc.

Herein, the first acoustic signal emitted from the acoustic signal emission module 10 is substantially the input acoustic signal provided to the optical sensing module 20 embedded in the energy storage device 40. The second acoustic signal that reaches, and is detected by, the optical sensing module 20 substantially derives from the first acoustic signal. To be more specific, after entering from the outside to the interior of the energy storage device 40, and transmitting through the various internal spaces within the energy storage device 40 (e.g. the shell, electrode, the electrolyte, the internal gaps, or the separator, etc.), the first acoustic signal may undergo attenuation, reflection, and/or transmission to thereby become the second acoustic signal before reaching the optical sensing module 20. As such, the second acoustic signal that is detected by the optical sensing module 20 substantially carries, and can be used for evaluating, the first internal state information of the energy storage device 40 (e.g. dendrite growth on the electrode surface, internal gas generation, electrode expansion, and electrolyte aging etc.). Within the optical sensing module 20, the second acoustic signal substantially modulates the first input optical signal received from the signal demodulation module 30, and the optical sensing module 20 then outputs the first optical signal and transmits it to the signal demodulation module 30.

The signal demodulation module 30 then demodulates and analyzes the first optical signal to thereby obtain the acoustic feature information that corresponds to the second acoustic signal. From the acoustic feature information, the first internal state information of the energy storage device 40 such as the dendrite growth, internal gas generation, electrode expansion, electrode aging, electrolyte aging, by-product generation, internal resistance, and state of charge (SOC), etc., can be obtained. To be more specific, by means of the signal demodulation module 30, the first optical signal can first be demodulated into an acoustic signal, and the acoustic signal can then be analyzed for time-domain intensity changes, wave velocity changes, and frequency-domain main lobe and side lobes power change analysis, so as to establish the corresponding relationship of the acoustic signal with relevant features of the energy storage equipment 40 (e.g. dendrite growth, internal gas generation, etc.). For example, by means of the signal demodulation module 30, the first optical signal can be converted through a fitting process into a time-domain signal, which then undergoes a frequency spectrum analysis using Fourier transform to obtain the energy distribution of the signals in terms of frequency, so as to analyze the powers at different frequencies that is distributed in all time slots to thereby obtain the frequency-domain signal. Finally based on this above correspondence relationship, the first internal state of the energy storage device 40, such as dendrite growth, internal gas generation, etc., can thus be determined.

In addition to the detection and analysis of acoustic signals to obtain the acoustic feature information for evaluating the first internal state of the energy storage device 40, the detecting system can optionally be further configured to detect and analyze optical signals.

According to some embodiments, the signal demodulation module 30 is further configured to provide a second input optical signal to the optical sensing module 20. Correspondingly, the optical sensing module 20 is further configured, upon receiving the second input optical signal, to output a second optical signal, and to transmit the second optical signal to the signal demodulation module 30, and the signal demodulation modulation module 30 is further configured to demodulate and analyze the second optical signal to thereby obtain the optical feature information for evaluating the performance of the energy storage device 40. Herein the optical feature information contains information of, and can be used for determining, the second internal state of the energy storage device, which may include quantitative information of an internal temperature, an internal pressure, or a refractive index of an electrolyte, etc.

Herein according to some embodiments, by means of the signal demodulation module 30, the second optical signal can be analyzed and demodulated to thereby obtain optical spectrum signals (which can be shortened as "spectrum signals"), and then the relationship between the optical spectrum signals and multiple parameters (e.g. temperature, pressure, refractive index of the electrolyte, etc.) inside the energy storage device 40, can be established. As such, parallel detection of multiple parameters can be substantially realized.

Herein, the energy storage device 40 can be one of a lithium battery, a sodium battery, a lead-acid battery, a fuel cell, a sodium-sulfur battery, a flow battery, a liquid metal battery, a metal air battery, a solar cell, or a supercapacitor. The energy storage device 40 disclosed herein can be mainly used in an emergency power supply or a standby power supply in a power system, an electric vehicle, a computer, a mobile phone or a portable mobile device, or an energy storage power station, etc.

Herein, the "interior" of the energy storage device 40 means any internal spaces inside the energy storage device 40, which can include a space in or on an electrode, a space within an internal gap, a space in or on the separator, or a space within the electrode gap, or a space within the electrolyte. Examples for an internal gap may include one or more gap positions corresponding to the hole in a cylindrical battery, the top cover of a square shell battery, and an inner position of a battery shell.

Herein, the "feature information" in this embodiment of the internal state detecting system, as in the "acoustic feature information" and/or in the "optical feature information" as provided above includes, but is not limited to, one or more of optical spectrum signals, frequency-domain signals, and time-domain signals.

Figure 2:
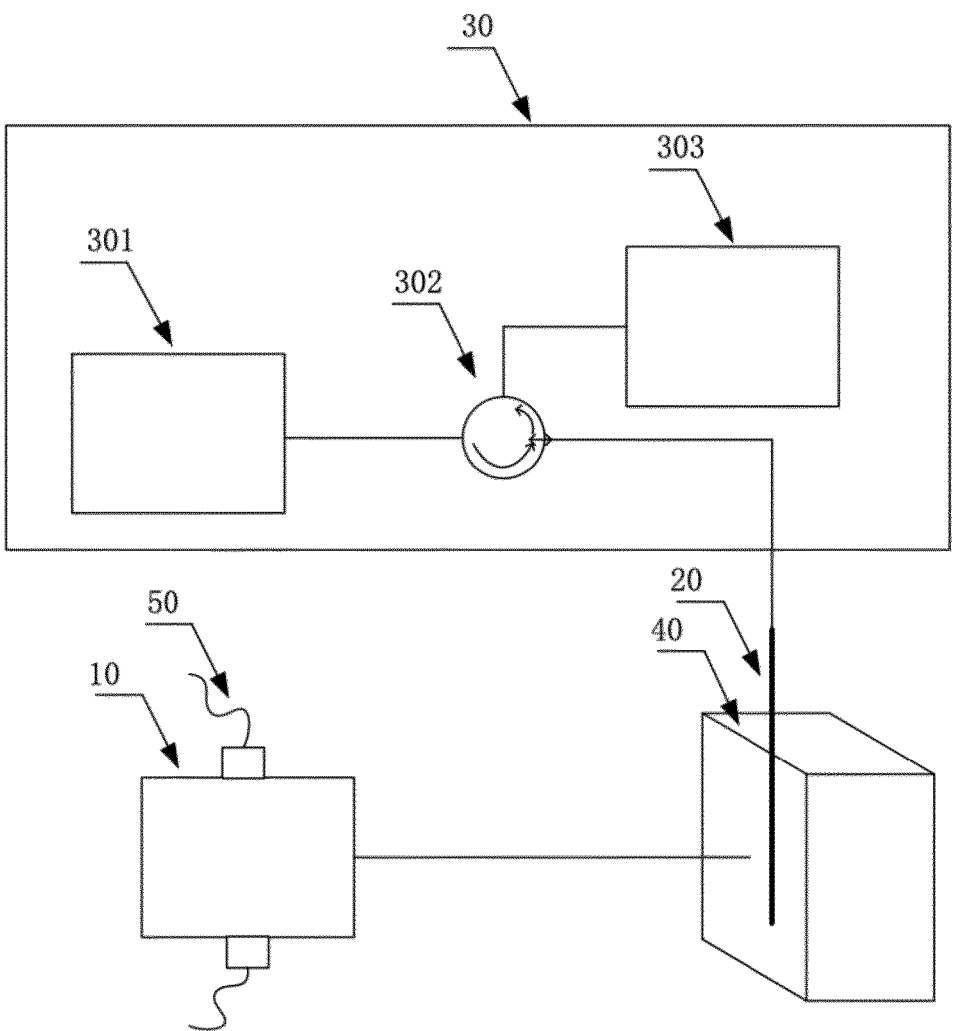
FIG. 2 illustrates a schematic diagram of an internal state detecting system for an energy storage device provided by some embodiments of the present disclosure, which includes a reflective type of optical sensing module.

FIG. 2 illustrates a schematic diagram of one embodiment of the internal state detecting system with a reflective optical sensing module. As shown in FIG. 2, the signal demodulation module 30 in this embodiment of the detecting system comprises a light source 301, an optical signal analyzer 303, and an optical path connector 302.

The light source 301 is configured to provide the first input optical signal, and optionally the second input optical signal, to the optical sensing module 20, which can comprise one or more of a laser light source, a broadband light source, or a supercontinuum light source. According to some embodiments, the output spectrum of the light source 301 can be approximately 200-4000 nm.

The optical path connector 302 is configured to optically and operably connect the light source 301, the optical sensor 20, and the optical signal analyzer 303. The optical connector 302 can comprise a circulator or a coupler.

The optical signal analyzer 303 is configured to demodulate and analyze at least one optical signal and then to output feature information contained in the at least one optical signal. Herein, the at least one optical signal may, according to different embodiments, originate from two sources, and may comprise a first optical signal and a second optical signal: (1) The first optical signal derives indirectly or partly from an acoustic signal. Specifically, upon emission of the first acoustic signal by the acoustic signal emission module 10 on the outside of the energy storage device 40, the optical sensing module 20 in the interior of the energy storage device 40 detects a second acoustic signal that carries the first internal state information (e.g. electrode surface dendrite growth, internal gas generation, electrode expansion, electrode aging, electrolyte aging, by-product generation, internal resistance, and state of charge (SOC), etc.) of the energy storage device 40, and then outputs the first optical signal that substantially results from the modulation of the second acoustic signal to the first input optical signal. (2) The second optical signal derives directly from an optical signal from the optical sensing module 20. Specifically, upon receiving the second input optical signal from the light source 301 of the signal demodulation module 30, the optical sensing module 20 obtains the second optical signal that carries the second internal state information (e.g. temperature, pressure, refractive index of the electrolyte, etc.) of the energy storage device 40.

Herein, according to some embodiments, the optical signal analyzer 303 is configured to detect certain physical features (i.e. the first internal state information) of the energy storage device 40 such as electrode surface dendrite growth, internal gas generation, electrode expansion, electrode aging, electrolyte aging, by-product generation, internal resistance, and state of charge (SOC), etc., which are substantially realized by measuring the first optical signal that is converted from the second acoustic signal by the optical sensing module 20, and to further output the corresponding feature information (i.e. acoustic feature information). According to some other embodiments, the optical signal analyzer 303 is further configured to determine certain physical quantity features (i.e. the second internal state information) such as refractive index, temperature, pressure, etc., which are substantially measured by the second optical signal obtained from the optical sensing module 20, and to further output the corresponding feature information (i.e. optical feature information).

This embodiment of the internal state detecting system can realize parallel measurement and analysis of acoustic and optical signals. The acoustic and optical signals do not interfere with each other and are easy to distinguish and modulate, and as such, the comprehensive use of the acoustic and optical signals can provide a multimodal, multi-dimensional, multi-parameter, and in-situ and in-operando detection method for the energy storage device 40. By obtaining the acoustic and optical signals at certain internal characterizing position of the energy storage device 40, this embodiment of the internal state detecting system can be used to detect and analyze certain corresponding feature information, which may include in-depth analysis of time-domain signals, frequency-domain signals, and spectrum signals, and then to effectively determine the source of the internal acoustic signals of the energy storage device 40, and to accurately analyze the characteristics of the electrode and/or electrochemical of the energy storage device 40. As such, the internal working performance (including SOC, temperature, internal pressure, interlayer expansion force, gas, dendrites, etc.), health state (including electrolyte aging, decrease in coulombic efficiency, etc.), and safety hazards (including internal short circuits, internal by-products, etc.) of the energy storage device 40 can be analyzed and determined.

In the following, more details are provided for the acoustic signal emission module 10 in the internal state detecting system as provided by the present disclosure.

In this embodiment, the acoustic signals emitted by the acoustic signal emission module 10 may comprise ultrasonic signals, which are used as an illustrating yet non-limiting example for explanation. The acoustic signal emission module 10 can be mounted onto the outside of the energy storage device 40, which can be operably coupled via an acoustic coupling medium. The acoustic signal emission module 10 is configured to emit acoustic signals, and by means of the acoustic coupling medium, the acoustic signals can penetrate from the outside of the energy storage device 40 to the internal characterizing position of energy storage device 40.

In this embodiment, the acoustic signal emission module 10 may include one or more acoustic transducers, which can include, but not limited to, magnetostrictive transducers, piezoelectric transducers, photoacoustic transducers, piezoelectric probes, spherical focused ultrasound probes, and cylindrical focused ultrasound probes, etc. Herein, the range of the preset frequency of the acoustic signal emission module 10 can be 20 kHz to 20 MHz, and preferably 2 MHz to 10 MHz. The acoustic signal emission module 10 can optionally provide one of the acoustic pulse emitters and acoustic pulse emission receivers as an excitation source and an amplified excitation source so as to adjust the frequency and intensity of the acoustic signals.

The acoustic signals emitted by the acoustic signal emission module 10 are allowed to penetrate from the outside of the energy storage device 40 to the internal characterizing position of energy storage device 40 by means of the acoustic coupling medium. The function of the acoustic coupling medium is to fill the gap between the acoustic signal emission module 10 and the energy storage device 40 to realize a gap-free coupling or connection, such that the acoustic signals can effectively enter into the interior of the energy storage device 40. The acoustic coupling medium can be a solid acoustic medium or a liquid acoustic medium. Examples for a solid acoustic medium may include a metal material or a resin material (e.g. an epoxy resin). Examples for a liquid acoustic medium may include an aqueous solution or an oily solution (e.g. silicone oil).

In the following, more details are provided for the optical sensing module 20 in the internal state detecting system as provided by the present disclosure.

With reference to the embodiment as illustrated in FIG. 2, the optical sensing module 20 is arranged at an internal characterizing position in the interior of the energy storage device 40, and is operably connected to the signal demodulation module 30. The optical sensing module 20 is configured to detect the second acoustic signal carrying the first internal state information of the energy storage device 40, to convert the second acoustic signal into the first optical signal (i.e. to output the first optical signal that substantially results from the modulation of the second acoustic signal to the first input optical signal), and then to transmit the first optical signal to the signal demodulation module 30.

Optionally, the optical sensing module 20 is further configured to directly measure the second internal state information of the energy storage device 40 by detecting the second optical signal upon receiving the second input optical signal, and to transmit the second optical signal to the signal demodulation module 30 to thereby obtain the optical feature information for the evaluation of the performance of the energy storage device 40.

In the following, more details are provided for the signal demodulation module 30 in the internal state detecting system as provided by the present disclosure.

With reference to the embodiment as illustrated in FIG. 2, the signal demodulation module 30 comprises a light source 301, an optical signal analyzer 303, and an optical path connector 302. Herein, the optical sensing module 20 comprises an optical fiber sensor, which will be used as an example for the description. Specifically in this embodiment, the optical sensing module 20 comprises a reflective optical fiber sensor 20. The light source 301 is configured to provide a first input optical signal to the optical path connector 302. The optical path connector 302 is configured to transmit the first input optical signal to the optical sensing module 20. The optical sensing module 20 is configured to detect the second acoustic signal carrying the first internal state information of the energy storage device 40, to convert the second acoustic signal into the first optical signal, and then to transmit the first optical signal to the optical path connector 302. The optical path connector 302 is then configured to further transmit the first optical signal to the optical signal analyzer 303. The optical signal analyzer 303 is configured to receive the first optical signal, to demodulate and analyze the first optical signal to thereby obtain the acoustic time-domain signals and the acoustic frequency spectrum signals, and to establish the corresponding relationship between the second acoustic signal and the first internal state information of the energy storage device 40.

Optionally, the optical sensing module 20 is further configured to directly measure the second internal state information of the energy storage device 40 by detecting the second optical signal upon receiving the second input optical signal, and to transmit the second optical signal to the optical path connector 302. The optical path connector 302 is then configured to further transmit the second optical signal to the optical signal analyzer 303. The optical signal analyzer 303 is further configured to receive the second optical signal by means of which the optical sensing module 20 directly measures the second internal state information of the energy storage device 40, to demodulate and analyze the second optical signal to obtain the optical spectrum signals, and to establish the corresponding relationship between the second optical signal and the second internal state information of the energy storage device 40.

In this embodiment, the optical path connector 302 comprises a circulator, which is used as an example for the description. The circulator is provided with three ports: the light source 301 is operably connected to a first port, the optical sensing module 20 is operably connected to a second port, and a third port is operably connected to the optical signal analyzer 303.

One specific working process of the signal demodulation module 30 according to one embodiment is as follows: the light source 301 emits the first input optical signal to the first port of the circulator; and the first port transmits the first input optical signal to the second port; and then the first input optical signal is provided to the optical sensing module 20 via the second port. After the optical sensing module 20 detects the second acoustic signal carrying the first internal state information of the energy storage device 40 and converts the second acoustic signal into the first optical signal, the optical sensing module 20 reflects the first optical signal to the second port. After the second port transmits the first optical signal to the third port, the optical signal analyzer 303 demodulates and analyzes the first optical signal thus received to obtain the acoustic time-domain signal and acoustic frequency spectrum signals. As such, the acoustic signals can reflect the first internal characteristics of the energy storage device 40.

Another specific working process of the signal demodulation module 30 in this embodiment is as follows: the light source 301 emits the first and second input optical signals to the first port of the circulator, and the first port further transmits the first and second input optical signals to the second port, which are then provided to the optical sensing module 20 via the second port. On the one hand, the optical sensing module 20 detects the second acoustic signal carrying the internal state information of the energy storage device 40 and converts the second acoustic signal into the first optical signal (herein, the first optical signal substantially results from the modulation of the second acoustic signal to the first input optical signal). On the other hand, the optical sensing module 20 also directly measures the internal state information of the energy storage device 40 by detecting the second optical signal (herein the second optical signal substantially derives from the second input optical signal). The optical sensing module 20 then reflects both the first optical signal and the second optical signal to the second port, and after the second port transmits the first and second optical signals to the third port, the third port transmits the first and second optical signals to the optical signal analyzer 303. The optical signal analyzer 303 then respectively demodulates and analyzes the received first and second optical signals to thereby obtain the acoustic time-domain signal, acoustic frequency spectrum signal, and/or optical frequency-domain signal. As such, the acoustic and optical signals can comprehensively reflect the internal features of the energy storage device 40.

FIG. 3 illustrates a schematic diagram of another embodiment of the internal state detecting system with a transmissive optical sensing module. As shown in FIG. 3, the signal demodulation module 30 comprises a light source 301 and an optical signal analyzer 303. The light source 301, the optical sensing module 20, and the optical signal analyzer 303 are sequentially and operably connected. Herein, the optical sensing module 20 comprises a transmissive optical fiber sensor 20.

The light source 301 is configured to provide the first input optical signal to the optical sensing module 20. The optical sensing module 20 is configured to detect the second acoustic signal carrying the first internal state information of the energy storage device 40, and to convert the second acoustic signal into the first optical signal (i.e. the first optical signal substantially results from the modulation of the second acoustic signal to the first input optical signal) and transmits it to the optical signal analyzer 303. The optical signal analyzer 303 is configured to receive the first optical signal, to demodulate and analyze the first optical signal to obtain the acoustic time-domain signal and acoustic frequency spectrum signal, and to establish the corresponding relationship between the first internal state information of the energy storage device 40 and the second acoustic signal.

Optionally, the light source 301 is further configured to provide the second input optical signal to the optical sensing module 20, the optical sensing module 20 is further configured to directly measure the second internal state information of the energy storage device 40 by detecting the second optical signal, and then to transmit the second optical signal to the optical signal analyzer 303. The optical signal analyzer 303 is further configured to receive the second optical signal, to demodulate and analyze the second optical signal to obtain the optical spectrum signals, and to establish the corresponding relationship between the second internal state information of the energy storage device 40 and the second optical signal.

One specific working process of the signal demodulation module 30 according to one embodiment is as follows. The light source 301 provides the first input optical signal to the optical sensing module 20. After detecting the second acoustic signal that carries the first internal state information of the energy storage device 40, the optical sensing module 20 converts the second acoustic signal into the first optical signal. The optical sensing module 20 then transmits the first optical signal to the optical signal analyzer 303. The optical signal analyzer 303 then demodulates and analyzes the first optical signal to obtain the acoustic time-domain signal and acoustic frequency signal. As such, the second acoustic signal can reflect the first internal feature information of the energy storage device 40.

Another specific working process of the signal demodulation module 30 according to another embodiment is as follows. The light source 301 provides the first input optical signal and the second input optical signal to the optical sensing module 20. On the one hand, the optical sensing module 20 detects the second acoustic signal carrying the first internal state information of the energy storage device 40 and converts the second acoustic signal into the first optical signal (herein, the first optical signal substantially derives from the modulation of the second acoustic signal to the first input optical signal). On the other hand, the optical sensing module 20 also directly measures the second internal state information of the energy storage device 40 by detecting the second optical signal (herein the second signal substantially derives from the second input optical signal). The optical sensing module 20 transmits both the first optical signal and the second optical signal to the optical signal analyzer 303. The optical signal analyzer 303 then respectively demodulates and analyzes the received optical signals to thereby obtain the acoustic time-domain signal, acoustic frequency spectrum signal, and optical frequency-domain signal. As such, the acoustic and optical signals can comprehensively reflect the first and second internal feature information of the energy storage device 40.

In any of the above two embodiments illustrated in FIG. 2 and FIG. 3, the optical sensing module 20 can include one or more optical waveguide sensors, which can include active sensors and/or passive sensors. The passive sensors include optical chips and/or fiber sensors. The fiber sensors can be optical fiber sensors which include one or more of tilted Bragg fiber gratings, fiber Bragg gratings, long-period gratings, fiber core diameter mismatch devices, fiber core misalignment devices, tapered fiber devices, micro-nano fiber devices, photonic crystal fiber devices, microstructured fiber devices, polymer fiber devices, sapphire fiber devices, fiber laser devices, fiber coupler devices, and self-assembled optical devices. In terms of modulation, the optical sensing module 20 includes one or more of an intensity-modulated fiber sensor, polarization-modulated fiber sensor, phase-modulated fiber sensor, and frequency-modulated fiber sensor. In terms of structure, the optical sensing module 20 includes a dual-beam interferometer and/or a multiple beam interferometer. The dual-beam interferometer includes one or more of Michelson interferometers, Mach-Zehnder interferometers, Sagnac interferometers, and Fizeau interferometers. The multiple beam interferometer includes Fabry-Perot interferometers.

When the energy storage device 40 is equipped with one single optical sensor 20, any of the above embodiments of the optical sensor can be selected. When the energy storage device 40 is equipped with multiple optical sensors 20, which can include at least two optical sensors 20 that are connected in series or in parallel. Each of the at least two optical sensors 20 can be selected from any one or more of the above embodiments, and they can be connected in series or parallel. It is noted that these optical sensors 20 as described above have advantages such as resistance to corrosion and strong anti-interference ability, allowing them to be relatively easy to implant into the interior of energy storage device 40.

Furthermore, in any of the above embodiments for the optical sensing module 20, the surface of the optical sensing module 20 can be covered or coated with a coating layer for preventing the reaction between the optical sensing module 20 and the interior of the energy storage device 40. The coating layer may comprise a protective layer and/or a sensitization layer. Herein the protective layer can be an inert nanofilm to prevent the reaction between the electrolyte or electrode and the optical sensing module 20. The inert nanofilm can be made of materials such as polypropylene (PP) or polyethylene (PE) that are resistant to electrolyte corrosion, with a thickness of less than 1 um. Herein, the sensitization layer can comprise a layer of a nanostructured material (e.g. a precious metal such as gold and silver), with a thickness of less than 50 nm. The sensitization layer is configured to enhance the acoustic and optical signals. Depending on different coating methods, the surface of optical sensing module 20 can be first coated with a nano coating, and then be coated further it with an inert nanofilm; or alternatively, a layer of nanostructured material can be coated on the surface of optical sensing module 20 before covering it with an inert nanofilm. There is no limitation to the coating methods.

In any of the embodiments as described above, the optical signal analyzer 303 can include a high-speed data acquisition board and a computer. The high-speed data acquisition board can be an AlazarTech acquisition board with a channel range of 1 to 16, a sampling rate range of 1 KS/s to 500 MS/s, and a resolution range of 8 to 16 bits.

In one specific example, the high-speed data acquisition board utilizes the AlazarTech acquisition board model ATS9146, which has 2 channels, a resolution of 14 bits, and a maximum sampling rate of 125 MS/s. The computer, combined with Labview programming, performs simulation and fitting processing on the acoustic signals. It converts them into time-domain signals by extracting and fitting the digital signals sent by the high-speed data acquisition board. The time-domain signals are then subjected to Fourier transform for frequency spectrum analysis, and the frequency-domain signals are outputted. This enables time-domain and frequency-domain analysis of the acoustic signals to monitor the internal working performance (including SOC, temperature, internal pressure, interlayer expansion force, gas, dendrites, etc.), service life, (including electrolyte aging, decrease in coulombic efficiency, etc.), and safety hazards (including internal short circuits, internal by-products, etc.) of the energy storage device 40.

In another example, an oscilloscope can be used as a substitute for the high-speed data acquisition board. The oscilloscope can also be used to acquire acoustic signals and obtain analog signals.

According to some embodiments, the energy storage device 40 can be connected to an electrochemical workstation. The electrochemical workstation is used for charging and discharging the energy storage device 40. Through the electrochemical workstation, the charging and discharging processes of the energy storage device 40 are recorded, and the curves of the electrical and acoustic signals during the charging and discharging processes are plotted. This provides a whole process of the changes in electrical and acoustic signals throughout the charging and discharging processes of the energy storage device 40, facilitating performance analysis. In addition to being connected to the electrochemical workstation, the energy storage device 40 can also be connected to a charging and discharging device or external loads, all of which are used for charging and discharging the energy storage device 40.

By embedding one or more optical sensors (i.e. they together constitute the optical sensing module 20) at different internal characterizing positions within the energy storage device 40, such as at internal positions corresponding to the electrode(s), internal gap(s), separator(s), and electrode gap(s), and electrolyte, and by applying the method as described above in steps S901-S903, it is possible to monitor the internal characterizing position of the energy storage device 40.

With reference to FIGS. 2 and 3, a movable brace 50 that is operably connected to and movably controlled by a displacement platform (e.g. a motor) is used to mount the acoustic signal emission module 10 onto, and to control the acoustic signal emission module 10 to move on the outside of, the energy storage device 40. In addition, the acoustic signal emission module 10 is uniformly coated with an acoustic coupling medium (not shown in the figures), and the acoustic signal emission module 10 is tightly pressed against the outer surface of the energy storage device 40.

According to some specific embodiments, the movable brace 50 aligns the acoustic signal emission module 10 at the center of the outer surface of the energy storage device 40, and allows the acoustic signal emission module 10 to move along the axial direction of the optical sensing module 20. During the testing process, the optical sensing module 20 can be embedded at the desired characterizing position(s) inside the energy storage device 40 for monitoring. The movable brace 50, with the center position of the contact surface between the energy storage device 40 and the acoustic signal emission module 10 as the origin, is configured to move at a preset velocity along the axial direction of the optical sensing module 20. During the cyclic charging and discharging process of the energy storage device 40, the first acoustic signal is emitted by the acoustic signal emission module 10 and is transmitted directly into the interior of the energy storage device 40 through the acoustic coupling medium. After multiple reflections and refractions at the various interfaces between different medium layers inside the energy storage device 40, the incident first acoustic signal becomes the second acoustic signal when reaching the optical sensing module 20, where the second acoustic signal is captured by the optical sensing module 20 and converted into the first optical signal. The first optical signal is then transmitted to, and analyzed and demodulated by, the signal demodulation module 30. As such, the movable brace 50 allows the scanning and monitoring of the various internal characteristic positions of the energy storage device 40, thereby realizing a multi-point monitoring of the energy storage device 40. It is to be noted that in addition to the axial movement, the movable brace 50 may allow the acoustic signal emission module 10 to move in a direction that is perpendicular to the axis of the optical sensing module 20. Together, such three-dimensional movement of the acoustic signal emission module 10 allows the multi-point and multi-dimensional scanning of the interior of the energy storage device 40. According to some other embodiments, the acoustic signal emission module 10 is itself movable (realized, for example, by a motor arranged therewithin) without the need to arrange the movable brace.

On a second aspect, an internal state detecting method for an energy storage device that substantially utilizes the internal state detecting system as described above is further provided.

According to some embodiments, the detection method may be based on the detecting system that is capable of derive the internal state information of the energy storage device by means of acoustic signals. As such, the detection method comprises the following steps:

(1) the acoustic signal emission module provides the first acoustic signal from the outside of the energy storage device to the inside of the energy storage device, and the signal demodulation module provides the first input optical signal to the optical sensing module;

(2) upon receiving the second acoustic signal when the first acoustic signal transmits inside the energy storage device, the optical sensing module outputs a first optical signal; and (3) upon receiving the first optical signal, the signal demodulation module demodulates and analyzes the first optical signal to thereby obtain acoustic feature information, and further obtains the first internal state information of the energy storage device based on the acoustic feature information.

Herein, the first internal state may comprise at least one of dendrite growth, internal gas generation, electrode expansion, electrode aging, electrolyte aging, by-product generation, internal resistance, or state of charge (SOC) of the energy storage device.

Herein, depending on different purposes and embodiments, step (3) may comprise at least one of the following analyses: time-domain intensity change analysis, wave velocity change analysis, and frequency-domain main lobe and side lobe power change analysis, to thereby obtain the first internal state information (e.g. dendrite growth, internal gas generation, etc.) of the energy storage device.

According to some other embodiments, the detection method may be based on the detecting system that is capable of derive the internal state information of the energy storage device by means of both acoustic signals and optical signals. As such, the detection method comprises, on top of the three steps described above, the following steps:

step (1) further comprises: the signal demodulation module further provides the second input optical signal to the optical sensing module;

step (2) further comprises: upon receiving the second input optical signal, the optical sensing module further outputs the second optical signal; and step (3) further comprises: upon receiving the second optical signal, the signal demodulation modulation module demodulates the second optical signal to thereby obtain the optical feature information, and further determines the second internal state of the energy storage device based on the optical feature information.

Herein, the second internal state comprises at least one of an internal temperature, an internal pressure, or a refractive index of an electrolyte of the energy storage device.

Herein, depending on different purposes and embodiments, step (3) may comprise at least one of the following analyses: intensity change analysis, wavelength change analysis, envelope change analysis, and area change analysis, to thereby obtain the second internal state information (e.g. internal temperature, internal pressure, refractive index, etc.) of the energy storage device.

In the following, several specific examples are provided for a more detailed description of the internal state detecting system and method for an energy storage device.

Dendrite Growth Detection

Provided below is a detailed description of the in-situ and in-operando detection method that is specifically applied for monitoring the dendrite growth on the electrode at the electrode-characterizing position within the energy storage device 40 (i.e., battery).

First, the acoustic signal transmitting module 10 is configured to emit the first acoustic signal having a center frequency of approximately 5 MHz. The choice of the 5 MHz central frequency is based on the positive correlation observed between the acoustic signal frequency and resolution, as well as the negative correlation observed between the frequency and penetration depth. The internal structure of the energy storage device 40 is complicated, which include a variety of media such as solid, liquid and gas phases. Therefore, the choice of acoustic frequency depends on experimental selection. It has been experimentally determined that the acoustic signals emitted by the acoustic signal emission module 10 with a center frequency of 5 MHz has good penetration while satisfying the resolution when monitoring the dendrite growth on the electrodes. It is to be noted that other acoustic signal center frequency can also be used.

Next, the first acoustic signal emitted by the acoustic signal transmitting module 10 transmits through the acoustic coupling medium and enters into the interior of the energy storage device 40. Within the multi-layered and multi-media structure of the energy storage device 40, which includes a shell, electrodes, and electrolyte, etc., the original first acoustic signal undergoes attenuation, reflection, and transmission, and becomes the second acoustic signal before reaching, and gets detected by, the optical sensing module 20. In this example, the optical sensing module 20 comprises an optical fiber with tilted fiber Bragg gratings (TFBGs), and more specifically, the TFBGs have a tilt angle of approximately 16 degrees. Experiments have shown that the embedding a 16° TFBG into the interior of the energy storage device 40 does not affect its performance. The rich cladding modes of the 16° TFBG exhibit high sensitivity to acoustic signals and greatly expand the wavelength range selected for the light source 301 of the signal demodulation module 30. Herein, the optical sensing module 20 is closely attached onto the electrodes of the energy storage device 40. After transmitting through the electrodes of the energy storage device 40 and reaching optical sensing module 20, the original first acoustic signal becomes the second acoustic signal. Then the optical sensing module 20 receives the second acoustic signal and outputs the first optical signal and transmits it to the signal demodulation module 30, which then analyzes and demodulates the first optical signal to thereby obtain an acoustic signal. Subsequently, further processing is performed to convert the acoustic signal into acoustic images, such as the time-domain waveforms shown in FIG. 4 and the frequency-domain waveforms shown in FIG. 5.

Finally, the software algorithms in the signal demodulation module 30 further processes and analyzes the above data to thereby determine the dendrite growth status on the electrode of the energy storage device 40 in terms of acoustic time-domain signals and acoustic frequency-domain signals.

Specifically, to determine the status of dendrite growth on the electrode of the energy storage device 40, the relative peak intensity of the energy storage device 40 can be defined as $\Delta E$, which is normalized within the range of 0 to 1. When $\Delta E$ is 0, it indicates no dendrite growth; when $\Delta E$ is 1, it indicates that the dendrite growth causes a short circuit between the positive and negative electrodes; and $\Delta E$ that is between 0 and 1 represents the growth state of dendrite. The principle is as follows: During the process of energy storing (charging) and energy releasing (discharging), the acoustic signal emission module 10 continuously emits the acoustic signals (i.e. the first acoustic signal as described above). The positive and negative ions in the electrolyte of the energy storage device 40 dynamically intercalate and detach from the active materials on the electrode surface, accompanied by oxidation and reduction reactions (oxidation during charging and reduction during discharging). In this process, the growth of dendrites on the electrode surface affects the characteristics such as density and volume, etc. of the electrode inside the energy storage device 40, resulting in changes in the relative intensity of the acoustic signal. The faster the dendrite growth, the faster the change in the relative intensity of the acoustic signal. Therefore, the optical sensing module 20 that is attached onto the electrode surface of the energy storage device 40 can accurately, and in a real-time manner, measure the abnormal changes in the acoustic signal, thereby enabling the in-situ and in-operando detection of the dendrite growth during the charging and discharging process of the energy storage device 40.

Figure 6:
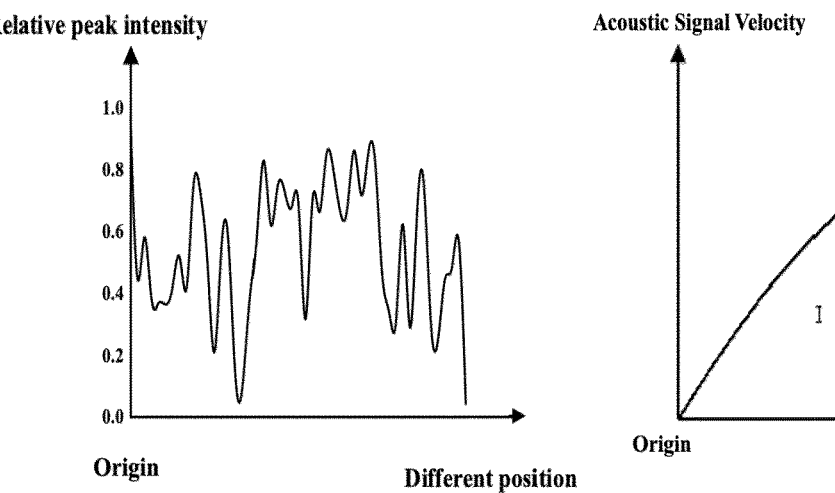
FIG. 6 shows a relationship curve between the growth of lithium dendrites at different positions inside an energy storage device and the relative peak intensity of the acoustic signals that are detected by some embodiments of the internal state detecting system.

To demonstrate the accuracy of the above measurement method in the present disclosure, it will be further elaborated below with the following specific embodiment, where the monitoring of lithium dendrite growth at multiple positions on the negative electrode of the energy storage device 40 is taken as an example. The position directly facing the acoustic signal emission module 10 is taken as the origin, and the distance of each internal characterizing position from the origin is plotted against the corresponding acoustic signal peak intensity, thereby creating a distance-intensity two-dimensional distribution curve. Measurements are taken at 5 MHz frequency to analyze the relationship between different characterizing positions and acoustic intensities. During signal processing, peak detection on the acoustic signals is performed, and the maximum intensity acoustic signal as the initial state that reflects the internal state of a specific position in the energy storage device 40 is identified. After multiple charge-discharge cycles of the energy storage device 40, measurements are taken again at 5 MHz to obtain the relationship between different characterizing positions and the acoustic signal intensity. Peak detection on the acoustic signals is performed again and the maximum intensity acoustic signal as the information that reflects the changed internal state of a specific position in the energy storage device 40 is identified. By comparing the relative differences in acoustic signal intensity before and after charging, the relationship between different positions in the energy storage device 40 and the relative acoustic intensity is obtained. The relative change in acoustic signal intensity is normalized and correlated with the dendrite growth state. When ΔE is 1, it is determined that the growth of the lithium dendrites has caused a short circuit between the positive and negative electrodes. When ΔE is 0, it is determined that there is no dendrite growth. When ΔE is between 0 and 1, it indicates the growth state of dendrites. FIG. 6 illustrates the relationship curve between the growth state of lithium dendrites at different characterizing positions within the energy storage device 40 and the relative intensity of the acoustic signals.

Electrolyte Aging Detection

Figure 7:
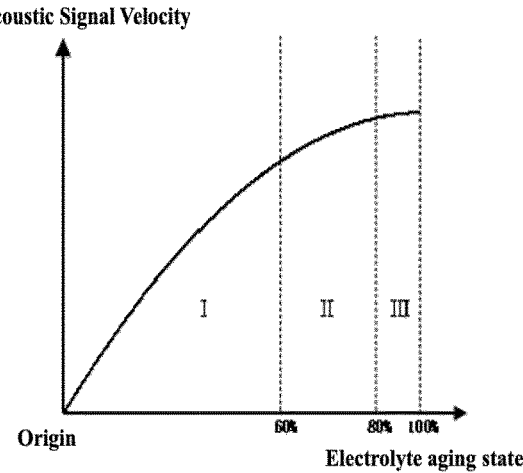
FIG. 7 shows a response function diagram of the health state of an energy storage device and the wave velocity of the acoustic signals that are detected by some embodiments of the internal state detecting system, where the optical sensing module is immersed in the electrolyte of the energy storage device.

Further provided below is a detailed description of the in-situ and in-operando detection method that is specifically applied for monitoring the aging state of the electrolyte at the electrolyte-characterizing position to reflect the health state of the energy storage device 40. When it is to monitor the aging state of the electrolyte, an optical sensor (i.e. the optical sensing module 20) is immersed in the electrolyte of the energy storage device 40. The refractive index of the electrolyte varies with its aging level, and the response of the acoustic signal to the refractive index is mainly reflected in the time domain, specifically in the different response time when the optical sensing module 20 first receives the acoustic signal. By establishing a response function between different levels of electrolyte aging and the acoustic signal wave velocity, the health state of the energy storage device 40 can be determined. The evaluation criterion is defined as the electrolyte aging state ranging from 0 to 100%. A state of 0% indicates a pristine electrolyte, while a state of 100% represents a no-longer-usable electrolyte. When the electrolyte aging state is between 0% and 60%, the health state of the energy storage device 40 is classified as Stage I, indicating a healthy state. When the electrolyte aging state is between 60% and 80%, the health state of the energy storage device 40 is classified as Stage II, indicating a sub-healthy state. When the electrolyte aging state is between 80% and 100%, the health state of the energy storage device 40 is classified as Stage III, indicating an unhealthy state. The relationship between the health state of the energy storage device, as reflected by the aging state of the electrolyte at the electrolyte location, and the response function of the acoustic signal wave velocity received by the optical sensor 20 immersed in the electrolyte, is illustrated in FIG. 7.

Internal Gas Generation Detection

Further provided below is a detailed description of the in-situ and in-operando detection method that is specifically applied for monitoring the gas generation at internal gap characterizing positions. Specifically, an optical sensor (i.e. the optical sensing module 20) is embedded at the internal gap characterizing position of the energy storage device 40. By recording the acoustic signal amplitude data corresponding to the scan point positions within the internal gap of the energy storage device 40, a local scan of the energy storage device 40 is conducted. This process obtains the localized amplitude data of the energy storage device 40, which represents a specific localized image of the energy storage device 40. The intensity change and wave velocity change of the time-domain signal can be used as the basis for qualitative, semi-quantitative and quantitative evaluation of the generated gas.

Electrode Expansion Detection

Further provided below is a detailed description of the in-situ and in-operando detection method that is specifically applied for monitoring the expansion state of the electrodes at an internal gap between the separator and electrode of the energy storage device 40. Specifically, an optical sensor (i.e. the optical sensing module 20) is embedded at the internal gap between the separator and the electrode of the energy storage device 40. The intensity changes of the time domain signal and the main lobe power changes in the frequency domain are used as the basis for qualitative, semi-quantitative and quantitative evaluation of electrode expansion.

Refractive Index Detection

Figure 8:
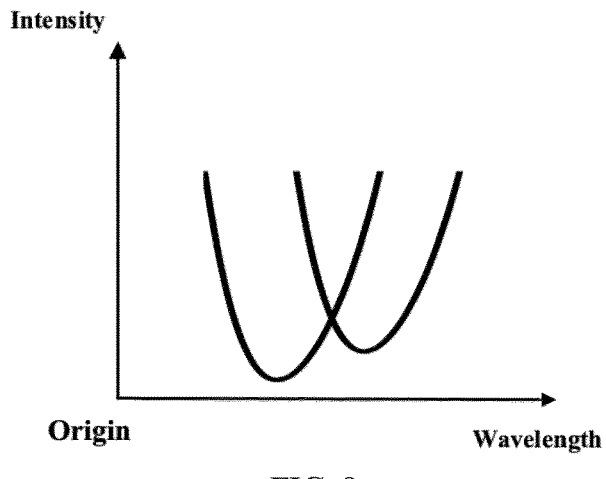
FIG. 8 shows wavelength and intensity correlation curves between the optical signals and the internal refractive indices of the electrolyte that are detected by some embodiments of the internal state detecting system.

Further provided below is a detailed description of the in-situ and in-operando detection method that is specifically applied for monitoring the refractive index state inside the monitored energy storage device 40. Specifically, an optical sensor 20 (i.e. the optical sensing module 20) is placed inside the device. The energy storage device 40 contains different media, such as solids, liquids, and gases, each having a different refractive index. The response of the optical signals to a different refractive index is mainly reflected in the optical spectral signals, specifically in terms of spectral signal intensity and wavelength. By establishing a response function between different refractive indices and optical spectral signals in the various media within the energy storage device 40, it is possible to determine the refractive index state within the device and thus monitor the different refractive index states. The intensity and wavelength of the optical signals received by the optical sensor 20 placed inside the energy storage device 40 are shown in FIG. 8.

By arranging one or more optical sensors (i.e. the optical sensing module 20) at specific internal positions of the energy storage device 40 and applying the in-situ and in-operando detection method provided in this present disclosure, it becomes possible to conduct in-depth analysis over the various features of the energy storage device 40, which is substantially realized by monitoring the alterations in the acoustic and/or optical signal. This method enables effective in-situ and in-operando acoustic analysis of the internal characteristics of the energy storage device 40. By determining the source of the acoustic signals and accurately analyzing the electrode characteristics and electrochemical properties of the energy storage device 40, it becomes possible to make determinations regarding potential issues within the device.

The internal state detecting system and method provided for energy storage devices substantially enables a real-time, in-situ, and precise measurement of multi-dimensional and multi-parameter (physical, chemical, electrochemical, etc.) state information within the energy storage device 40. This system lays the foundation for evaluating the operational performance, service life, and early detection of safety hazards in the energy storage device 40.

On a third aspect, the present disclosure further provides a processing device for controlling and implementing the internal state detecting method as described above. Specifically, the processing device is communicatively connected to the acoustic signal emission module, the optical sensing module, and the signal demodulation module of the internal state detecting system as described above. The processing device includes a processor and a memory storing computer program instructions that are executable by the processor. When executed by the processor, the computer program instructions would allow the steps of the internal state detecting method as described above to be orderly executed and implemented.

On a fourth aspect, the present disclosure further provides a computer readable storage medium, on which the computer program instructions as described above in the third aspect are stored. When the computer program instructions are executed by the processor, the various steps of the detection method can be orderly executed and implemented.

Figure 9:
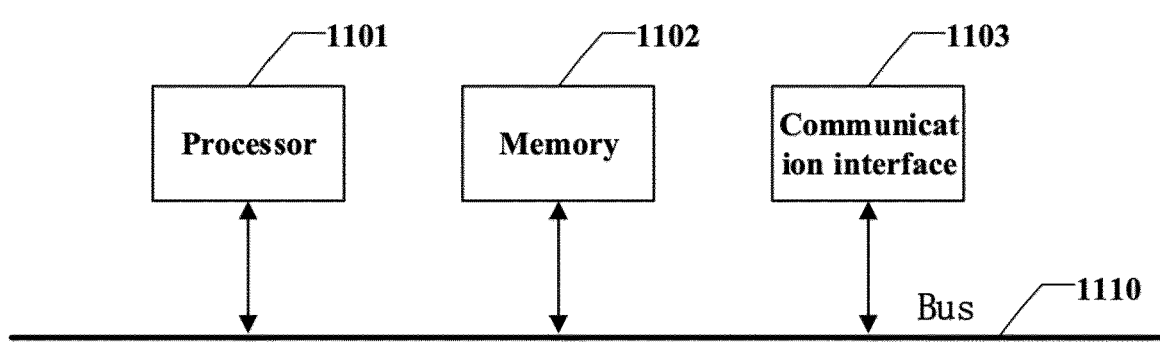
FIG. 9 illustrates a schematic diagram of a hardware structure of a processing device used to execute and implement the internal state detecting method for an energy storage device provided by some embodiments of the present disclosure.

FIG. 9 illustrates a schematic diagram of a hardware structure of a processing device used to execute and implement the internal state detecting method for an energy storage device provided by some embodiments of the present disclosure.

As shown in the figure, the processing device for energy storage device may include a processor 1101 and a memory 1102 that stores computer program instructions.

Specifically, the processor 1101 can be a central processing unit (CPU), an Application-Specific Integrated Circuit (ASIC), or one or more integrated circuits configured to implement the embodiments of this application. The memory 1102 can include high-capacity storage for data or instructions. Examples of such memory include hard disk drives (HDDs), floppy disk drives, flash memory, optical discs, magneto-optical discs, magnetic tapes, or Universal Serial Bus (USB) drives, or a combination of two or more of these. In appropriate cases, the memory 1102 can be removable or non-removable (or fixed) media. In suitable cases, the memory 1102 can be internal or external to the integrated gateway failover device. In specific embodiments, the memory 1102 is non-volatile solid-state memory.

Memory 1102 can include read-only memory (ROM), random-access memory (RAM), magnetic disk storage devices, optical storage devices, flash memory devices, electrical, optical, or other physical/tangible memory storage devices. Therefore, typically, the memory 1102 comprises one or more tangible (non-transitory) computer-readable storage media encoded with software including computer-executable instructions and, when the software is executed (e.g., by one or more processors), is operable to perform the operations described in the referenced method according to one aspect of this disclosure.

The processor 1101 achieves the energy storage device state detection method described in any of the embodiments mentioned above by reading and executing the computer program instructions stored in the memory 1102.

According to some embodiments, the processing device can further include a communication interface 1103 and a bus 1110. The processor 1101, memory 1102, and communication interface 1103 are communicatively connected and communicate with each other through the bus 1110.

The communication interface 1103 is primarily used to facilitate communication between the modules, devices, units, and/or device within the embodiments of this present disclosure. The bus 1110 includes hardware, software, or a combination of both that interconnects the components of the online data flow metering device. Examples of buses include Accelerated Graphics Port (AGP) or other graphics buses, Enhanced Industry Standard Architecture (EISA) bus, Front Side Bus (FSB), HyperTransport (HT) interconnect, Industry Standard Architecture (ISA) bus, InfiniBand interconnect, Low Pin Count (LPC) bus, Memory bus, Micro Channel Architecture (MCA) bus, Peripheral Component Interconnect (PCI) bus, PCI-Express (PCI-X) bus, Serial ATA (SATA) bus, Video Electronics Standards Association Local (VLB) bus, or a combination of two or more of these. In appropriate cases, the bus 1110 may include one or more buses. Although specific buses are described and depicted in the embodiments, the present disclosure contemplates any suitable bus or interconnect.

Those skilled in the art in the relevant field can clearly understand that, for the sake of convenience and brevity, the specific operational processes of the methods described above can refer to the corresponding processes in the system embodiments mentioned earlier and need not be reiterated here.

The above embodiments are merely specific embodiments of the present invention, and the scope of protection of the present invention is not limited thereto. Those skilled in the art can easily conceive various equivalent modifications or substitutions within the scope of the technology disclosed in the present invention, all of which should be encompassed within the scope of protection of the present invention.

The invention claimed is:

1. A system capable of in-situ and in-operando monitoring one or more internal states of an energy storage device, comprising:

an acoustic signal emission module, configured to provide a first acoustic signal from an outside of the energy storage device to an inside of the energy storage device;

an optical sensing module, arranged in an interior of the energy storage device; and a signal demodulation module, configured to provide a first input optical signal to the optical sensing module;

wherein:

the optical sensing module is configured, upon receiving a second acoustic signal when the first acoustic signal transmits inside the energy storage device, to output a first optical signal to the signal demodulation module; and the signal demodulation module is further configured to demodulate and analyze the first optical signal to thereby obtain acoustic feature information, and then to obtain a first internal state information of the energy storage device based on the acoustic feature information.

2. The system of claim 1, wherein:

the signal demodulation module is further configured to provide a second input optical signal to the optical sensing module;

the optical sensing module is further configured, upon receiving the second input optical signal, to output a second optical signal to the signal demodulation module; and the signal demodulation modulation module is further configured to demodulate and analyze the second optical signal to thereby obtain optical feature information, and then to obtain a second internal state information of the energy storage device based on the optical feature information.

3. The system of claim 2, wherein the second internal state information comprises at least one of an internal temperature, an internal pressure, or a refractive index of an electrolyte of the energy storage device.

4. The system of claim 1, wherein the first acoustic signal is of a preset frequency having a range of 20 kHz to 20 MHz.

5. The system of claim 1, wherein the acoustic signal emission module is capable of moving on an outer surface of the energy storage device, thereby allowing the system to realize a multi-point monitoring of the energy storage device.

6. The system of claim 1, wherein the optical sensing module comprises at least one optical sensor, each arranged at a different characterizing position in the interior of the energy storage device.

7. The system of claim 6, wherein the interior of the energy storage device comprises at least one characterizing position, each selected from a group consisting of a position corresponding to an electrode, a position corresponding to an internal gap, a position corresponding to a separator, a position corresponding to an electrolyte, and a position corresponding to an electrode tab.

8. The system of claim 6, wherein the number of the at least one optical sensor in the optical sensing module is more than one, and the at least one optical sensor is operably connected in series or in parallel.

9. The system of claim 6, wherein each of the at least one optical sensor is an active optical sensor or a passive optical sensor, wherein the passive optical sensor is selected from an optical chip or a fiber sensor.

10. The system of claim 1, wherein the optical sensing module comprises an optical fiber sensor having tilted fiber Bragg gratings (TFBGs).

11. The system of claim 1, wherein the optical sensing module is of a reflective type, and the signal demodulation module comprises a light source, an optical signal analyzer, and an optical path connector, wherein:

the light source is configured to provide the first input optical signal to the optical sensing module;

the optical path connector operably connects the light source, the optical sensing module, and the optical signal analyzer, and is configured, upon receiving the first optical signal from the optical sensing module, to transmit the first optical signal to the optical signal analyzer; and the optical signal analyzer is configured to demodulate the first optical signal to thereby obtain the acoustic feature information.

12. The system of claim 11, wherein:

the light source is further configured to provide a second input optical signal to the optical sensing module;

the optical sensing module is further configured, upon receiving the second input optical signal from the light source, to output a second optical signal to the optical path connector;

the optical path connector is further configured to transmit the second optical signal to the optical signal analyzer; and the optical signal analyzer is further configured to demodulate the second optical signal to thereby obtain the optical feature information.

13. The system of claim 1, wherein the optical sensing module is of a transmissive type, and the signal demodulation module comprises a light source and an optical signal analyzer, wherein:

the light source, the optical sensing module, and the optical signal analyzer are sequentially and operably connected;

the light source is configured to provide the first input optical signal to the optical sensing module; and the optical signal analyzer is configured to demodulate the first optical signal from the optical sensing module to thereby obtain the acoustic feature information.

14. The system of claim 13, wherein:

the light source is further configured to provide a second input optical signal to the optical sensing module;

the optical sensing module is further configured, upon receiving the second input optical signal from the light source, to output a second optical signal to the optical signal analyzer; and the optical signal analyzer is further configured to demodulate the second optical signal to thereby obtain the optical feature information.

15. The system of claim 1, wherein the energy storage device is selected from a group consisting of a lithium battery, a sodium battery, a lead-acid battery, a fuel cell, a sodium-sulfur battery, a flow battery, a liquid metal battery, a metal air battery, a solar cell, and a supercapacitor.

16. The system of claim 1, wherein the first internal state information comprises at least one of dendrite growth, internal gas generation, electrode expansion, electrode aging, electrolyte aging, by-product generation, internal resistance, or state of charge (SOC) of the energy storage device.

17. A method for monitoring one or more internal states of an energy storage device using the system according to claim 1, comprising:

(1) the acoustic signal emission module provides the first acoustic signal from the outside of the energy storage device to the inside of the energy storage device, and the signal demodulation module provides the first input optical signal to the optical sensing module;

(2) upon receiving the second acoustic signal when the first acoustic signal transmits inside the energy storage device, the optical sensing module modulates the first input optical signal and outputs a first optical signal; and (3) upon receiving the first optical signal, the signal demodulation module demodulates and analyzes the first optical signal to thereby obtain acoustic feature information, and further obtain the first internal state information of the energy storage device based on the acoustic feature information.

18. The method of claim 17, wherein the first internal state information comprises at least one of dendrite growth, internal gas generation, electrode expansion, electrode aging, electrolyte aging, by-product generation, internal resistance, or state of charge (SOC) of the energy storage device.

19. The method of claim 17, wherein:

step (1) further comprises: the signal demodulation module further provides the second input optical signal to the optical sensing module;

step (2) further comprises: upon receiving the second input optical signal, the optical sensing module further outputs the second optical signal; and step (3) further comprises: upon receiving the second optical signal, the signal demodulation modulation module demodulates the second optical signal to thereby obtain the optical feature information, and further obtain the second internal state information of the energy storage device based on the optical feature information.

20. The method of claim 19, wherein the second internal state information comprises at least one of an internal temperature, an internal pressure, or a refractive index of an electrolyte of the energy storage device.

\* \* \* \* \*